US012129155B2

(12) United States Patent
Peippo et al.

(10) Patent No.: US 12,129,155 B2
(45) Date of Patent: Oct. 29, 2024

(54) MAIN GIRDER OF BRIDGE CRANE

(71) Applicant: KONECRANES GLOBAL CORPORATION, Hyvinkää (FI)

(72) Inventors: Juha Peippo, Hyvinkää (FI); Antti Kontio, Hyvinkää (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 218 days.

(21) Appl. No.: 17/756,345

(22) PCT Filed: Nov. 25, 2020

(86) PCT No.: PCT/FI2020/050795

§ 371 (c)(1),
(2) Date: May 23, 2022

(87) PCT Pub. No.: WO2021/105562

PCT Pub. Date: Jun. 3, 2021

(65) Prior Publication Data

US 2023/0348235 A1 Nov. 2, 2023

(30) Foreign Application Priority Data

Nov. 26, 2019 (FI) ..................................... 20196016

(51) Int. Cl.
*B66C 6/00* (2006.01)
*B66C 17/00* (2006.01)
(Continued)

(52) U.S. Cl.
CPC ................ *B66C 6/00* (2013.01); *B66C 17/00* (2013.01); *E04C 3/02* (2013.01); *E04C 3/04* (2013.01);
(Continued)

(58) Field of Classification Search
CPC ... B66C 6/00; B66C 17/00; E04C 3/02; E04C 3/04; E04C 3/06; E04C 2003/0465; E04B 2001/2445; E04B 2001/2454
See application file for complete search history.

(56) References Cited

U.S. PATENT DOCUMENTS 3,294,252 A 12/1966 Hosoi et al.
3,404,640 A * 10/1968 Langer ...................... B66C 6/00 105/169
(Continued)

FOREIGN PATENT DOCUMENTS

AT 10850 U1 * 11/2009
CH 416 009 A 6/1966
(Continued)

OTHER PUBLICATIONS

Extended European Search Report for European Application No. 20892947.1, dated Jan. 3, 2023.

*Primary Examiner* — Jessie T Fonseca
(74) *Attorney, Agent, or Firm* — Birch, Stewart, Kolasch & Birch, LLP

(57) ABSTRACT

A main grinder of a bridge crane, intended to be supported by its ends to end girders of the bridge crane and which comprises an elongated box-type central web, whereby there is, formed in the central web on at least one end of the main girder, a cutting slot running substantially in the longitudinal direction of the main girder, and connected to this cutting there is a knife plate, extending from a bottom of the cutting slot substantially to the end of the main girder, for supporting to the end girder.

14 Claims, 4 Drawing Sheets

(51) Int. Cl.

| | |
|---|---|
| ***E04C 3/02*** | (2006.01) |
| ***E04C 3/04*** | (2006.01) |
| ***E04C 3/06*** | (2006.01) |
| *E04B 1/24* | (2006.01) |

(52) U.S. Cl.

CPC ........ *E04C 3/06* (2013.01); *E04B 2001/2445* (2013.01); *E04B 2001/2454* (2013.01); *E04C 2003/0465* (2013.01)

(56) References Cited

U.S. PATENT DOCUMENTS

| | | | | |
|---|---|---|---|---|
| 6,082,562 | A | 7/2000 | Riikonen | |
| 2015/0259179 | A1* | 9/2015 | Pa mann | B66C 6/00 212/71 |
| 2015/0266703 | A1* | 9/2015 | Pa mann | B66C 6/00 212/71 |
| 2021/0070589 | A1* | 3/2021 | Peippo | B66C 9/10 |

FOREIGN PATENT DOCUMENTS

| | | | | | |
|---|---|---|---|---|---|
| CN | 205076713 | U | * | 3/2016 | B66C 19/00 |
| CN | 106744298 | A | * | 5/2017 | B66C 6/00 |
| CN | 207596326 | U | | 7/2018 | |
| CN | 110626936 | A | * | 12/2019 | |
| CN | 114634103 | A | * | 6/2022 | |
| CN | 116730186 | A | * | 9/2023 | |
| DE | 2556246 | A1 | | 6/1977 | |
| DE | 202008005769 | U1 | * | 9/2008 | B66C 6/00 |
| FR | 2195759 | A1 | | 3/1974 | |
| GB | 1005800 | A | | 6/1964 | |
| GB | 1068184 | A | | 5/1967 | |
| JP | 49-127959 | U | | 11/1974 | |
| KR | 20100083434 | A | * | 7/2010 | |
| KR | 101487885 | B1 | * | 1/2015 | |
| WO | 2012148260 | A1 | | 11/2012 | |

* cited by examiner

MAIN GIRDER OF BRIDGE CRANE

BACKGROUND OF THE INVENTION

The invention relates to a horizontal main girder of a bridge crane, intended to be supported by its ends to end girders of the crane and comprising an elongated box-type central web.

There are several different methods to modify the main girder of a bridge crane in its end area. The need for the various types of end supports in such a case arises from different requirements of a drive guide of the crane. The most common ways to achieve a support for an end of the main girder is a so-called “Top Connection”, in which the main girder is supported over its entire height on the end support, and a so-called “Top Medium Connection”, in which only a part of the height of the main girder is on an end support. With the latter solution, the main girder can fit in cramped spaces and with different kinds of “lateral diversions” additional space can be created for e.g. pipes, electrical wires etc. in the end area in the vicinity of the crane track. In addition, a “Side Connection” support is used, in which the main girder is supported to a side of an end support.

Typical prior art “Top Medium Connection” solutions include various vertical narrowings and stiffening joints at the ends of the main girder. The making of the joints in such a case is laborious. Placing different kinds of joining plates is time consuming at the manufacturing stage because some of the plates are provided with bevels, the joint may include a plurality of stiffener plates, and many of the plates are of different sizes. Some welds may be in challenging locations from the viewpoint of manufacturing. Each joint must be separately designed to meet the strength-technical requirements. Modifying dimensions according to the required space causes the need to re-design the joint in question every time in relation to the thickness, angles, and dimensions of the plates to be used. There is no one joint type which would allow a plurality of needs to be fulfilled as concerns height and lateral diversion. Currently all these parameters must be selected according to the application and need in question.

SUMMARY OF THE INVENTION

It is an object of the invention to eliminate the aforementioned draw-backs and problems when implementing the support onto an end of the main girder. This object is achieved by means of the inventive main girder which is characterised in that there is, formed in a central web on at least one end of the main girder, a cutting slot running substantially in the longitudinal direction of the main girder, and connected to this cutting slot there is a knife plate which extends from a bottom of the cutting slot substantially to the end of the main girder, for supporting to an end girder.

When the main girder is typically supported on an end girder, the bottom side of the knife plate is additionally substantially free from the central web over a specific length from an end surface of the main girder for said support.

Preferred embodiments of the invention are disclosed in the dependent claims.

The solution according to the invention is adaptable bot in the vertical direction and lateral diversions on a wide area. This makes it possible to meet the requirements in each case as well as possible, and to offer better solutions than previously. A big advantage of the present invention also lies in that both the final form of an end of the central web, or the plates used for the central web, and the cutting slot made in them may be cut without any intermediate steps with the same plasma, laser, or water cut in one go. It is possible to set specific threshold values for the structure both for the height and lateral diversions, within which the structure may freely change without the need to carry out strength calculations each time separately. The solution allows the manufacture of asymmetrical main girders without the need to compromise on adequate strength or the delivery lead-time.

An end of the main girder is as easy as possible to manufacture, because all the required parts may be advantageously welded in place from the outside of the central web, and the welder’s working position is good for each weld they are making. The welder need not inhale welding gases related to internal welding. The welds are easy to access for the welder and inspector. The solution put forth is advantageous for both manual and automated welding. The joints come out as fillet joints, whereby there is no need for welds requiring penetration. In the optimal performance area of the form of the end, the welds are formed with one bead, making manufacture faster.

The invention allows shifting the forces resulting from hoisting a load and the weight of the crane itself between the main girder’s end and the critical transfer zone which is over a length of approximately one or two metres from the end towards the centre part of the main girder.

LIST OF FIGURES

In the following, the invention will be explained in greater detail in connection with the preferred embodiments and with reference to the attached drawing, in which.

Figure 5:
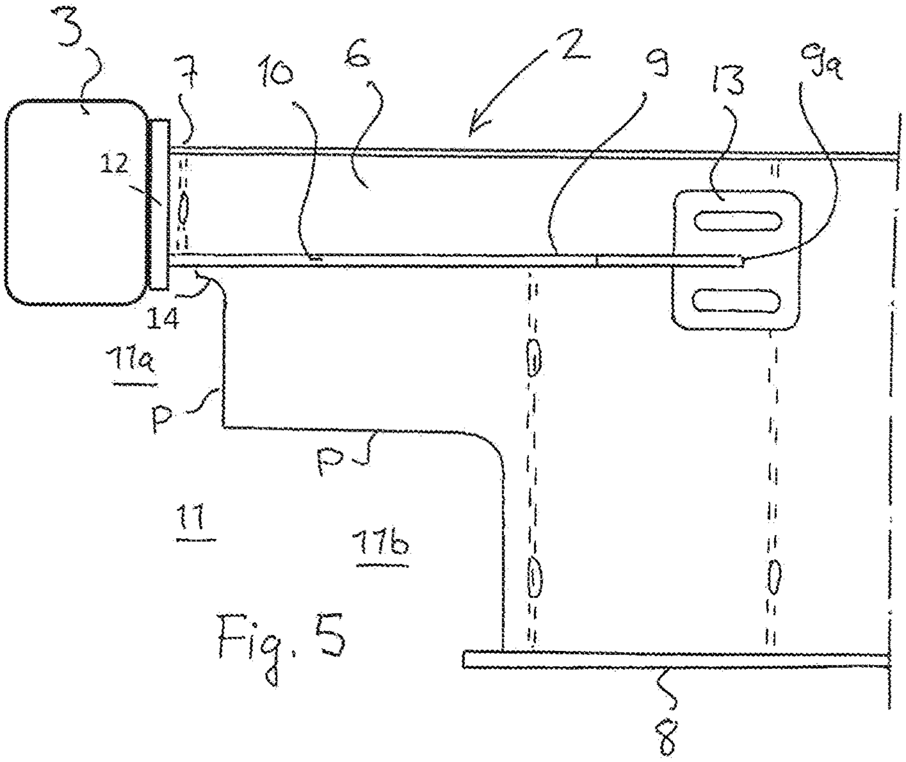
Figure 6:
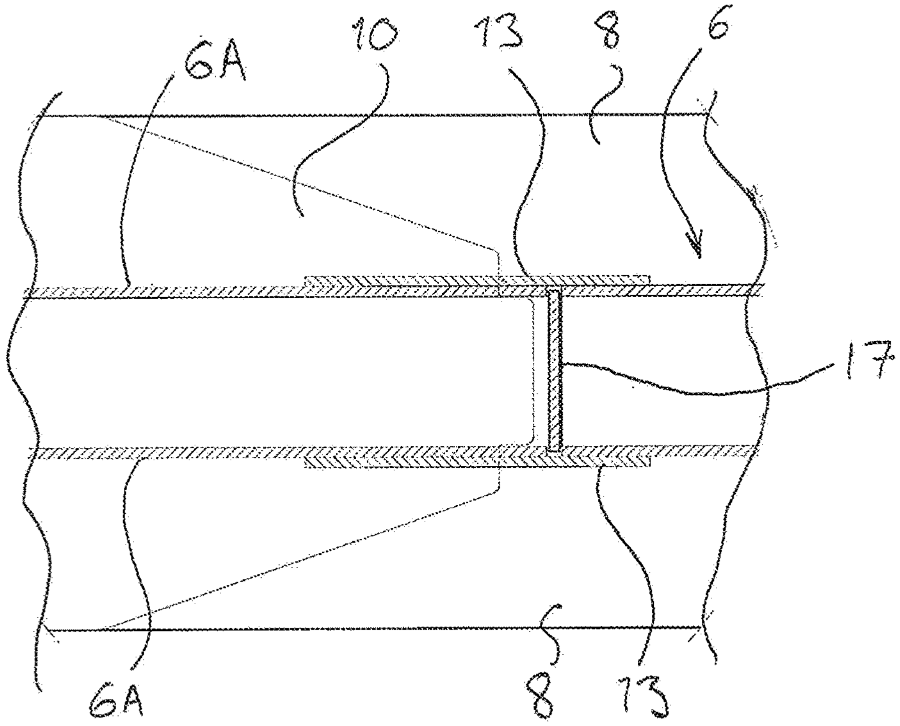
Figure 7:
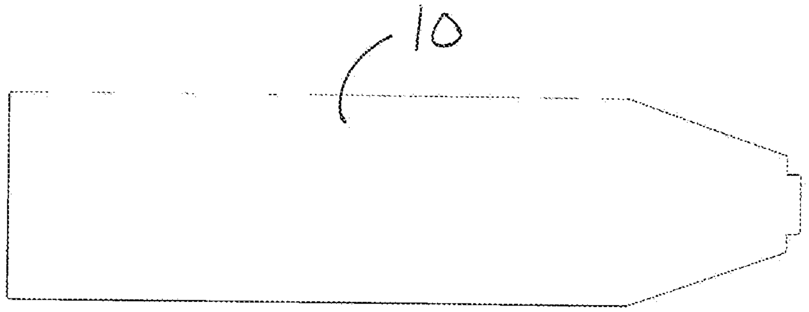

FIGS. 4*a* to 4*d* show inventive main girder ends of different shapes, where the end is supported on the main girder;

FIG. 5 is a side view of an end of the inventive main girder of the bridge crane, where the end is supported to a side of the main girder;

FIG. 6 shows a partial horizontal cross section from above the knife plate at the main girder ends according to the preceding figures;

FIG. 7 is a top view of the basic shape of the knife plate; and

Figure 8A:
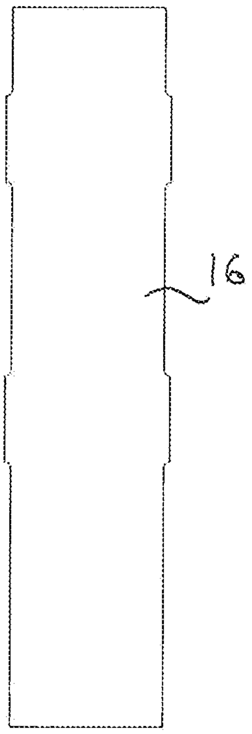
Figure 8B:

FIGS. 8*a* and 8*b* show transverse internal intermediate plates of an end of the main girder.

DETAILED DESCRIPTION OF THE INVENTION

Figure 2:
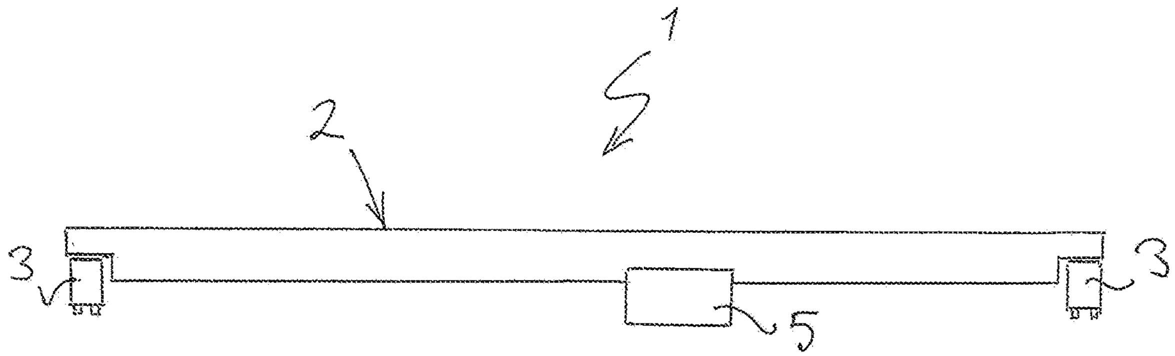
FIG. 2 is a side view of the bridge crane of FIG. 1, the bridge crane having symmetrical ends of the main girder.
Figure 1:
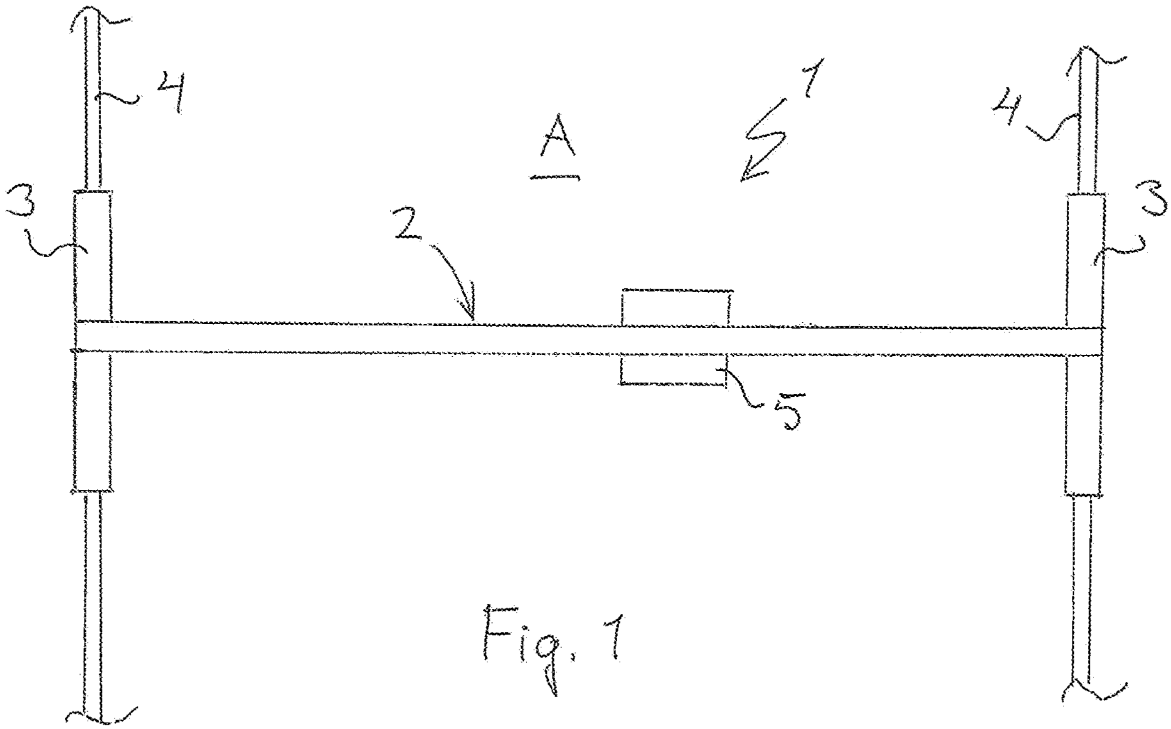
FIG. 1 is a top view of a simplified bridge crane.

With reference at first to FIGS. 1 and 2, the main components of a bridge crane 1 are a horizontal main girder 2; end girders 3, transverse in relation to the main girder 2, to which the main girder 2 is supported at both of its ends; rails 4 at the sides of a crane space A, along which the end girders 3 run supported by their wheels (not shown); and a trolley 5 moving along the main girder 2, with its hoisting apparatus (not shown). The crane space A next to and around the rails 4 is often limited, and the present invention solves the problems caused by this space restriction. There may be several main girders 2 in parallel, whereby a trolley 5 may be supported by several main girders 2.

Figure 3:
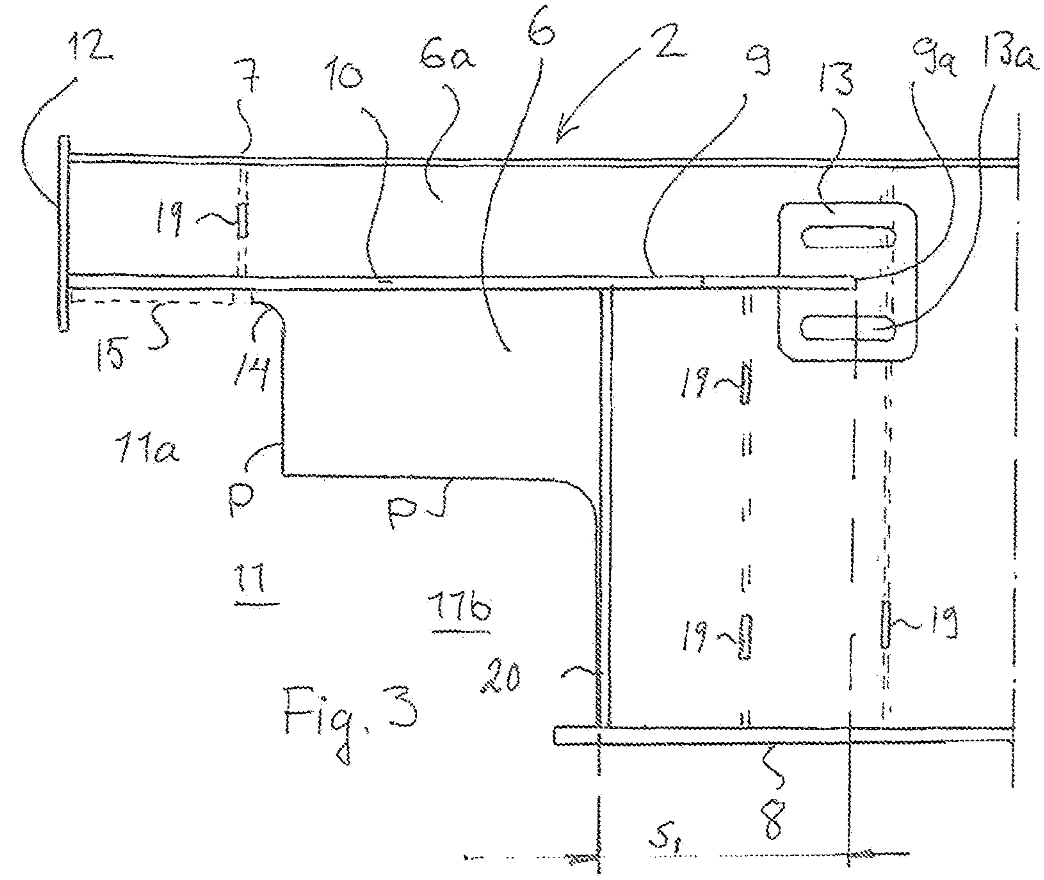
FIG. 3 is a side view of an end of the inventive main girder of the bridge crane, where the end is supported on the main girder.

Referring in addition to FIG. 3, the main girder 2 comprises in this inventive structure an elongated box-type central web 6, and typically, an elongated top flange 7 or top plate on its top surface, and an elongated bottom flange 8 on the bottom surface, supported to which bottom flange 8 the trolley 5 of this example runs on the main girder 2. The trolley 5 could also be supported to the top flange 7. In both cases, it could also be supported to the side surfaces of the central web 6. Web plates 6A of the central web 6 are interconnected with the intermediate plates 16 and 17, shown in FIGS. 8*a* and 8*b*, which can be welded from the outside through intermittent openings 19 reserved for the purpose. The intermediate plates 16, 17 have outward projecting projections which are adapted in the openings 19 in connection with combining the central webs 6, and the projections are welded in the openings 19 from outside the main girder. In the same way, the spacer plates 16, 17 may be advantageously welded to the top flange 7 by means of the tongues.

Formed on both ends of the central web 6, in other words the main girder 2, there is a cutting slot 9 running horizontally in the longitudinal direction of the main girder 2, and connected to this cutting slot 9 there is a knife plate 10 which extends from a bottom 9*a* of the cutting slot 9 to the end of the main girder 2 for supporting to the end girder 3 whereby the bottom side of the knife plate 10 is free from the central web 6 over a specific length from an end surface of the main girder 2 for said support.

Starting from the end surface of the main girder 2 over a specific length, on the bottom side of the knife plate 10, a part of the central web 6 has been cut off with a side profile P of a specific shape to form a space 11 for ventilation ducts, cable shelves, power supply rail of the crane, etc.

The height for the portion 6*a* of the central web 6 over the space 11, and therefore knife plate 10, is selected depending on the maximum weight to be placed on the main girder 2. The minimum height of the portion 6*a* may typically be approximately ⅕ of the total height of the central web 6, such as 150 mm. This ensures that the shearing stress caused by the weight of the main girder 2 and trolley 5, as well as the load to be hoisted, may be managed, and that there is room to attach the knife plate 10.

If the space 11 is "two-piece", as shown in FIG. 3, and has a space 11*a* extending to the bottom surface of the knife plate 10, and a space 11*b* in which the central web 6 extends to the selected depth below the knife plate 10, the minimum height of the central web 6 at this place depends on the length of the space 11*b* in the main girder's 2 direction when the space 11 is typically only of the width required by the support to the end girder 3. When the areas 11*a*, 11*b* are mainly rectangular, it is simple to give design instructions for them as well as the allowed main dimensions for the joining areas for various loading situations. Programming mainly rectangular shapes in sheet work to manufacture sheets is also simple. The position in the height direction of the knife plate 10 in the central web 6 as well as the shape and size of the space 11 therefore entirely depend on the loading and application of the bridge crane 1 and may greatly vary, the essential matter being the cutting slot 9 and the knife plate 10 therein, the positioning of the succeeding intermediate plates 16, 17, and the reinforcement plate 13 at the end of the knife plate 10. In FIG. 3, touching the space 11*b* on the right, a substantially vertical closing plate 20 is adapted between the web plates 6A, which at the bottom borders on the bottom flange 8 and on the knife plate 10 at the top. This closing plate 20 is welded from the space 11*b* side with a uniform weld, from left to right in FIG. 3, so that the weld forms the letter U. The bottom edge is placed on the bottom flange 8, the vertical portions on the inner surfaces of the web plates 6A, as high as welding allows. The end plate 12 and closing plate 20 close the end area of the main girder 2, but perfect sealing is not necessary achieved. The volume defined by the spaces 11*a*, 11*b*, knife plate 10, and closing plate 20 in the structure is advantageously open at the bottom. The right-angled outer edge of the central web 6, shown at the junction of the spaces 11*a*, 11*b*, and the inner edge defined by the radius of curvature at the edge of the space 11*b* may naturally be formed in various ways. The essential matter in the dimensioning of the main girder 2 is to manage the total deflection of the main girder 2 within the allowed limits.

A support plate 15 may be advantageously connected to the free bottom surface of the knife plate 10, for supporting to the end girder 3.

In the example described, an end plate 12 is fixed to the end surface of the main girder 2 and the end of the knife plate 10, and a stress-distributing reinforcement plate 13 is fixed on both sides of the central web 6 in the area on the side of the bottom 9*a* of the cutting slot 9, the reinforcement plate extending on a specified area on the front, rear, top and bottom side of the bottom 9*a* of the cutting slot 9. This reinforcement plate 13 is used to ease up the stress concentration at the end of the knife plate 10, and possibly likewise the surrounding stress concentrations around the openings and gaps. The material thickness of the reinforcement plate 13 is advantageously the same as the material thickness of the web plates 6A. The reinforcement plate 13 is advantageously a square or rectangle, and it has longitudinal through-openings 13*a* made in it. These openings 13*a* are advantageously placed horizontally in the assembly, that is, in the direction of the length of the main girder 2. The dimensioning for the openings 13*a* is so chosen that a fillet weld may be made at the top edge and bottom edge of the opening 13*a*, also horizontally, when the reinforcement plate 13 is placed on the central web 6. There is need to weld the outer edges of the reinforcement plate 13. The weld slightly resembles a plug weld which is expanded for the dimension of the elongated opening 13*a* in the main girder 2 direction, but differs from a plug weld in that two parallel fillet welds are enough, and the entire open space of the opening need not be filled with a weld. The goal is to make welding and placing a welding tool easier, so that the top flange 7 is not on the extension of the welding tool or hand. The bottom edge of the end plate 12 is advantageously extended downwards, whereby an edge support can be formed to support the support plate 15 laterally. When a sliding joint as the one described in the patent application PCT/FI2019/050298 is used, the movement range and/or twisting of the joint in question may also be restricted by supporting or restricting from the lateral direction with a clearance by means of the downward extended end plate 12. In a sliding joint, the potential falling of the main girder 2 from the end girder 3 is also prevented by means of the end plate 12. The main task of the end plate 12 is to block the box structure of the main girder and to stiffen the structure to some ex-tend at this location. The end plate 12 is more important below in the "Side Connection" solution, to be described below in FIG. 5, in which forces are brought through it from the main girder 2 to a flank of the end girder 3. The support plate 15 is advantageously a rectangular plate that has free holes for a bolt connection between the end girder 3 and knife plate 10. Different options exist for fastening the support plate 15: a bolt joint, weld joint, and a sliding joint made with bolts.

Between the main girder 2 and end girder 3, on at least one end, there is a sliding joint to restrain the movements and stresses of the bridge crane.

The fastenings of the knife plate 10, end plate 12, and reinforcement plate 13 are most advantageously done by welding. The knife plate 10 is advantageously welded on its entire length to the central web 6, so on the top and bottom sides. The reinforcement plate 13 is placed on the welded knife plate 10 and welded in place by making horizontal fillet welds, for example 2+2 pcs. on the edges of the open slots 13*a*, and the point of the knife plate 10 end and reinforcement plate 13 is welded with a filled weld.

In addition, advantageously formed in the web portion below the knife plate 10, there is a projection 14 in contact with the bottom surface of the knife plate 10 and extending towards the end surface of the main girder 2. This projection 14 bears significance from the viewpoint of the service life of the joint of the knife plate 10, because this projection 14 reduces the stress concentration at the joint edges and prolongs the lifespan of this detail. The height of the projection 14 may be set to constant, but so that it nevertheless has a minimum dimension. By setting a minimum, the goal is to ensure that at least some of the projection 14 is left even when the welding heat seeks to melt the projection on the edge. Below the projection 14, there is a notch rounded with a 90 degree arch length, in which a standard radius of curvature may advantageously be used, even though the end area is often designed differently in relation to the need of the space 11.

When the knife plate 10 and bottom flange 8 are substantially of the same thickness, the knife plate 10 acts, in a manner of speaking, as an extension of the bottom flange 8 in the area of the portion, i.e. space 11, cut off the central web 6 from below the knife plate 10, and on an area even longer, taking loads on the main girder 2 to its end. From the viewpoint of shifting loads, it is possible to set a dimension s1 for the longitudinal overlap in the length direction of the main girder 2, which dimension s1 is restricted on the one hand by the joint to the central web 6 of the tip flank seen on the outside of the trapezium of the knife plate 10 at the reinforcement plate 13, and on the other hand the joint between the central web 6 and bottom flange 8, at the outermost point closer to the end on the end girder 3 side. The overlap dimension s1 may be 200 to 1000 mm. The knife plate 10 is advantageously cut off a thicker plate than the web plates 6A or reinforcement plates 13 whereby the knife plate 10 edges may remain uneven or differ from a right angle in relation to the plane surface (top of bottom surface). In this case, it is advantageous that complex forms are not made on the knife plate 10 edges, or that there is no need to connect precisely to these edges. It is well-founded in this case to connect the knife plate 10 by its straight plane surfaces, so top of bottom surface, as shown in FIG. 3, for example. Similarly, the possible slots are more preferably made in thin plates, such as the central web 6 and reinforcement plates 13.

When the inventive cutting slot-knife plate structure 9, 10 is at both ends of the main girder 2, these structures 9, 10 do not have to be identical but they can be made according to the requirements and application of the customer. If there are several main girders side-by-side, such as two main girders to support the trolley 5, as many as 4 different ends of the main girder may be formed, if so required.

Figure 4A:
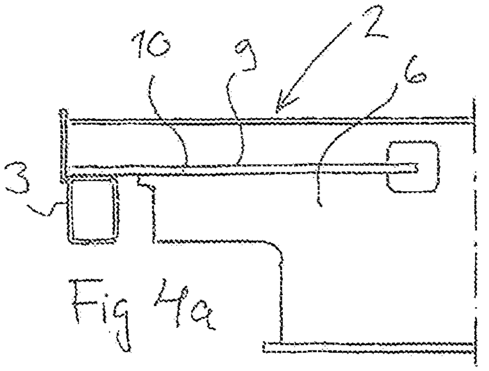
Figure 4B:
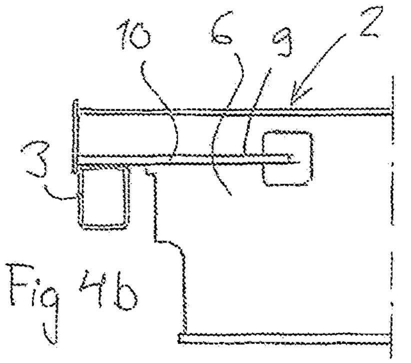
Figure 4C:
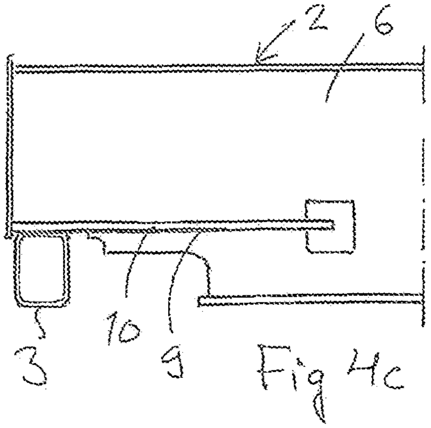
Figure 4D:
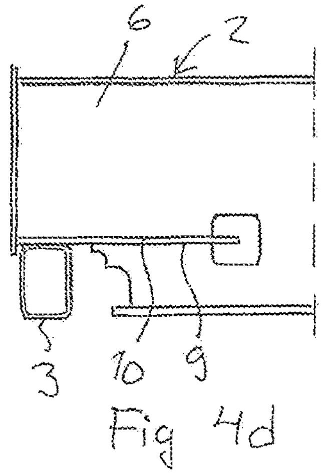

FIGS. 4*a* to 4*b* show, by way of example, what kind of different shapes for the ends of the main girder 2 are implementable with the present invention. The connecting area of the main girder 2 need not be alike at both ends of the main girder. The area 11*b* in FIG. 3 may be separately modified for both connection areas of the main girder 2 according to the space needs of the customer. It may be considered worth pursuing that the height of the support for the end girders 3 is the same at both ends of the main girder 2 so that the main girder 2 is not tilted. In some cases, the main girder 2 of a bridge crane, gantry crane, or semi-gantry crane is adapted to move on rails 4 that are at two different height positions. Even in such a case, the main girder 2 or part thereof is substantially horizontal.

The knife plate 10 is advantageously a rectangle which is narrowed at its end into the shape of a trapezium. The width of the knife plate 10 on the portion of its rectangle is advantageously 2 to 4 times the distance between the web plates 6A. The knife plate 10 is advantageously not wider than the width of the bottom flange 8. The thin tip of the trapezium may be substantially the same as the distance between the web plates 6A of the central web 6. The tip may show a projection protruding forward on the front side of the tip, the width of which substantially corresponds with the width between the inner surfaces of the web plates 6A. This projection makes the assembly of the web plates 6A easier at the manufacture. As an alternative embodiment for the knife plate 10, instead of the trapezium tip there may be a fork-type tip in which the branches of the fork become gentler within the main girder 2, and the local stress peak on the flanks of the web plates 6A can be evened out over the corresponding joint length. The fork may be shaped as a parabola, for example, in which the parabola opens towards the centre part of the main girder 2. In this embodiment, the reinforcement plates 13 may in an advantageous case be left out. On the other hand, the projection at the tip of the trapezium cannot be utilised in the assembly. The knife plate 10 is advantageously a plate-like material which is of similar material within the main girder 2 and internally connects the joints of the cutting slots 9 made in the central web 6 and the knife plate 10. Due to the structure, the knife plate 10 may support the central webs 6 from the inside and transfer forces between the central webs 6.

As shown in FIG. 5, the main girder 3 according to the invention may be alternatively connected to the side of the end plate 12, forming the so-called "Side Connection" fastening. In such a case, the end plate 12 is selected from a stronger material thickness than in the "Top Medium" fastening described first, and the end plate 12 is also wider (i.e. longer in the direction of the end girder 3) to form bolt joints between the end plate 12 and end girder 3. In this "Side Connection" fastening, the space 11 may potentially be smaller than in the "Top Medium" fastening, because the end surface of the main girder 2 in the longitudinal direction of the main girder 2 faces away from the end girder 3 by the width of the end girder 3 as compared to the "Top Medium" fastening.

The above description of the invention is only intended to illustrate the basic idea of the invention. A person skilled in the art may, however, implement its details within the scope of the attached claims.

The invention claimed is:

1. A main girder of a bridge crane, intended to be supported by opposing ends to end girders of the bridge crane, comprising:

an elongated box-type central web, a cutting slot in the central web and running substantially in a longitudinal direction of the main girder, and a knife plate in the cutting slot and extending from a first end of the opposing ends of the cutting slot to a first end of the main girder for supporting to one of the end girders.

2. The main girder as claimed in claim 1, wherein a part of the central web has been cut off with a side profile to form a space extending under the knife plate.

3. The main girder as claimed in claim 1, wherein the central web does not contact a bottom surface of the knife plate over a predetermined length from an end surface of the main girder.

4. The main girder as claimed in claim 3, wherein a support plate is fixed to the bottom surface of the knife plate, for supporting to the one of the end girders.

5. The main girder as claimed in claim 1, wherein an end plate is attached to an end surface of the main girder and an end of the knife plate.

6. The main girder as claimed in claim 1, wherein an end plate is attached to an end surface of the main girder and an end of the knife plate, the end surface of the main girder configured to be attached to the end girder.

7. The main girder as claimed in claim 1, wherein a stress-distributing reinforcement plate is fixed on opposite sides of the central web at the first end of the cutting slot, the reinforcement plate extending over an area covering the first end of the cutting slot.

8. The main girder as claimed in claim 1, wherein a projection in contact with a bottom surface of the knife plate and extending towards an end surface of the main girder is formed in the central web below the knife plate.

9. The main girder as claimed in claim 1, further comprising an end plate is attached to an end surface of the main girder and a first end of the knife plate and a reinforcement plate covering a second end of the knife plate, wherein the knife plate, the end plate, and the reinforcement plate are joined by welding.

10. The main girder as claimed in claim 1, wherein an elongated top flange is arranged at a top of the central web, and an elongated bottom flange is arranged at a bottom of the central web.

11. A main girder as claimed in claim 10, wherein a width of the knife plate is substantially equal to a width of the lower flange.

12. The main girder as claimed in claim 1, wherein a cutting slot and a knife plate are arranged at both a second end of the opposing ends of the main girder.

13. The main girder as claimed in claim 1, wherein the cutting slot has a top surface and a bottom surface.

14. The main girder as claimed in claim 1, wherein the central web contacts at least a portion of a bottom surface of the knife plate.

* * * * *